United States Patent Office 2,805,244
Patented Sept. 3, 1957

2,805,244

PRODUCTION OF ACRYLONITRILE

James F. Gabbett, Jr., Weymouth, and Thomas R. Steadman, Waban, Mass., assignors, by mesne assignments, to Escambia Chemical Corporation, Pace, Fla., a corporation of Delaware No Drawing. Application November 29, 1954,
Serial No. 471,916

5 Claims. (Cl. 260—465.3)

This invention relates to the production of chemicals and more particularly to a process for removing oxygen from gaseous mixtures containing the same.

A principal object of the present invention is to produce high yields of acrylonitrile readily and cheaply by reacting hydrogen cyanide with an oxygen-free acetylene stream.

Another object of the invention is to provide a process for removing oxygen from gaseous mixtures containing saturated and unsaturated hydrocarbons.

Still another object of the invention is to provide a process for removing oxygen from acetylene streams such as, for example, "Wulff" process gas and "Sachsse" process gas.

Other objects of the invention will in part be obvious and will in part appear hereinafter.

The invention accordingly comprises the process involving the several steps and the relation and the order of one or more of such steps with respect to each of the others which are exemplified in the following detailed disclosure, and the scope of the application of which will be indicated in the claims.

For a fuller understanding of the nature and objects of the invention, reference should be had to the following detailed description.

It is well known that acrylonitrile can be prepared by reacting hydrogen cyanide with acetylene in the vapor phase in the presence of a suitable catalyst. In the copending application of Gabbett et al., Serial No. 412,635, filed February 25, 1954, now abandoned, it has been shown that high yields of acrylonitrile could be obtained by the catalytic vapor phase reaction between hydrogen cyanide and acetylene streams containing less than about 15 percent acetylene. The preferred acetylene streams produced by such well-known methods as the "Wulff," "Sachsse" or like processes which utilize hydrocarbons or mixtures thereof as the starting material have been generally found to contain oxygen. The presence of oxygen in the gaseous mixture results in substantially lower conversions and lower yields of acrylonitrile. This undesirable result is due primarily to the reaction of the oxygen with hydrogen cyanide and the formation of an intensely hot zone in the catalyst bed.

Thus, when hydrogen cyanide and a stream of acetylene, containing oxygen in addition to saturated and unsaturated hydrocarbons and inert gases, are passed, at elevated temperatures, over the catalyst described and claimed in the aforementioned copending application, there is a more or less competitive action between the acetylene and the oxygen for the hydrogen cyanide. A considerable portion of the hydrogen cyanide passing through the reactor thus reacts with the oxygen to form oxygenated products such as carbon monoxide and water, leaving less hydrogen cyanide to react with the acetylene. Thus only low yields of acrylonitrile can be obtained. Additionally, the reaction of oxygen with the catalyst produces an intensely hot zone in the catalyst bed which increases, at the expense of the acrylonitrile, the formation of the undesirable saturated nitriles, propionitrile and acetonitrile. The removal of oxygen from an oxygen-contaminated acetylene stream before it enters the reactor is necessary to eliminate the formation of any hot spot or zone in the catalyst bed and the oxidation of the hydrogen cyanide and other hydrocarbons present in the acetylene stream, so that high conversions and high yields of acrylonitrile may be obtained. The removal of oxygen, however, must not only be selective but must also be accomplished under conditions which do not lead to partial oxidation of the saturated and unsaturated hydrocarbons present in the gaseous mixture. The present invention is thus primarily directed to an efficient and economical process for selectively removing oxygen from gaseous mixtures containing saturated and unsaturated hydrocarbons such as, for example, gaseous mixtures representative of "Wulff" and "Sachsse" process gas.

The process of the present invention preferably comprises passing a gaseous mixture, containing saturated and unsaturated hydrocarbons and contaminated with oxygen, over carbon heated to a temperature sufficient to effect substantially complete removal of the oxygen from the gaseous mixture. In a preferred embodiment of the invention, the gaseous mixture, containing saturated and unsaturated hydrocarbons, may be a dilute acetylene stream such as that produced by the "Wulff" or "Sachsse" processes. These gaseous mixtures usually contain less than 2 percent of oxygen. The process is most efficient when the gaseous mixtures are contaminated with less than about 5 percent oxygen.

In a preferred aspect of the invention, the carbon employed for the removal of oxygen from the gaseous mixture is preferably an unactivated softwood charcoal. The temperature to which the preferred charcoal is heated during the removal of oxygen from the gaseous mixture is dependent to a great extent upon such factors as the quantity of oxygen present in the gaseous mixture and the space velocity at which the gaseous mixture passes over the charcoal. When the preferred gaseous mixtures are contaminated with less than about 5 percent oxygen, then such gaseous mixtures are preferably passed over the charcoal heated to a temperature between about 175° C. and 275° C. at space velocities between about 300 and 800 hr.$^{-1}$ (STP). Under these conditions, substantially complete reaction between the oxygen and the heated charcoal is effected to produce carbon oxides.

A specific detailed method of practicing the present invention is set forth in the following non-limiting examples which are directed more specifically to the production of acrylonitrile from hydrogen cyanide and acetylene.

*Example 1*

115 grams of an unactivated softwood charcoal were heated, at atmospheric pressure, to a temperature of about 700° C. in a stream of hydrogen for about 24 hours. Water and other oxygenated products formed during the conditioning were removed, together with volatile organic compounds. The charcoal, on completion of the hydrogenation, was found to weigh 90 grams. 75 grams of the deoxygenated charcoal was then impregnated with an aqueous solution containing above 75 grams of sodium hydroxide to provide, after drying, about 10 percent by weight of sodium hydroxide in the charcoal. Upon completion of the sodium hydroxide impregnation, the catalyst was placed in a Vycor reactor tube and heated, at atmospheric pressure, at a temperature on the order of about 550° C. in a stream of hydrogen cyanide, until the recovery of hydrogen cyanide in the off-gases rose to over 80 percent which, in this case, was on the order of about 60 minutes.

An acetylene stream produced according to the "Wulff"

process and consisting of about 18.4% by volume methane, 9.9% ethylene, 8.5% carbon monoxide, 8.4% nitrogen, 41.3% hydrogen, 8.2% acetylene, and 1.2% oxygen was passed over deoxygenated softwood charcoal heated to a temperature on the order of about 250° C. at a space velocity of about 550 hr.$^{-1}$ (STP) until substantially complete removal of the oxygen from the acetylene stream had been effected. A mixture of the oxygen-free acetylene and hydrogen cyanide was passed at a space velocity of about 550 hr.$^{-1}$ (STP) through the Vycor reactor tube containing approximately 82.5 grams of the prepared catalyst. The reactor tube was heated and maintained by means of a molten salt bath within the temperature range of between about 550° C. and 600° C. The mole ratio of acetylene to hydrogen cyanide was about 1.2 to 1.

The average conversion of hydrogen cyanide to acrylonitrile of this 42-hour run was 64.5%, while the average yield of acrylonitrile was 85.5% based on hydrogen cyanide. There was synthesized a weight of acrylonitrile equal to about 6.4 times the weight of the deoxygenated charcoal used in preparing the catalyst. The average yields of propionitrile and acetonitrile based on hydrogen cyanide were 2.8% and 6.5% respectively.

*Example II*

Similar conditions of temperature, catalyst, space velocity, mole ratio of acetylene to hydrogen cyanide, etc., existed here as in Example I with the exception of the acetylene stream. In this run, the acetylene stream, produced by the "Wulff" process and consisting of about 18.8% by volume methane, 12.1% ethylene, 9.1% carbon monoxide, 12.8% nitrogen, 36.5% hydrogen, 10.3% acetylene, and 1.4% oxygen, was not subjected to any oxygen removal treatment prior to its entry into the reactor.

The average conversion of hydrogen cyanide to acrylonitrile of this 37-hour run was 43.3%, while the average yield of acrylonitrile was 55.2% based on hydrogen cyanide. There was synthesized a weight of acrylonitrile equal to about 4.2 times the weight of the deoxygenated charcoal used in preparing the catalyst. The average yields of propionitrile and acetonitrile based on hydrogen cyanide were 4.7% and 10.4% respectively.

The major effect of the oxygen in the above acetylene stream was observed to be the formation of an uncontrollable hot spot in the catalyst bed which, as can be seen, led to excessive amounts of acetonitrile and propionitrile and apparently also to hydrogen cyanide oxidation.

A comparison of the yields of acrylonitrile obtained in the above examples clearly illustrates the advantage of removing oxygen from oxygen-contaminated acetylene streams. Acetylene streams produced by methods which utilize hydrocarbons or mixtures thereof as the starting material generally are found to contain oxygen. One well-known method of producing acetylene is the "Wulff" process. This process essentially involves the thermal cracking of hydrocarbon gases or vapors at a high temperature. The "Wulff" process and modifications thereof are fully described and claimed in U. S. Patents 1,880,307, 1,880,308, 1,880,309, 1,966,779, 2,037,056, 2,236,534, 2,236,535, 2,236,555, 2,319,679, 2,475,093 and many others. Another well-kown method of producing acetylene is the "Sachsse" process. This process involves the incomplete combustion of a hydrocarbon or mixtures of hydrocarbons to form acetylene. A more detailed discussion of the "Sachsse" process may be found in U. S. Patents 2,195,227, 2,235,749 and 2,664,450. While the process is especially adapted for the removal of oxygen from acetylene streams, it is also applicable, in general, to the removal of oxygen from other gaseous mixtures containing saturated hydrocarbons and/or unsaturated hydrocarbons and/or free hydrogen.

The composition of the acetylene stream obtained from the above processes depends to a great extent upon the hydrocarbon or hydrocarbons employed as the starting material. However, it generally contains in various proportions acetylene, carbon oxides, hydrogen, nitrogen, unsaturated and/or saturated hydrocarbons, and oxygen. The oxygen content of such acetylene streams for the most part is not greater than 5 percent and is most frequently on the order of less than about 2 percent.

Any one of many forms of carbon may be employed for removing the oxygen from gaseous mixtures of the present invention. However, it is preferable, from an economical standpoint, to employ unactivated softwood charcoal. The charcoal may be utilized as it is obtained from the producer, or it may be deoxygenated with hydrogen prior to use. In the production of acrylonitrile by the method described in the aforementioned copending application Serial No. 412,635, it is preferable to use unactivated, deoxygenated charcoal or spent catalyst to remove the oxygen from oxygen-contaminated acetylene streams prior to their entering the reactor.

The temperature at which the carbon is to be heated is dependent to some extent upon such factors as the quantity of oxygen present in the gaseous mixture, which must be selectively removed, and the space velocity at which the gaseous mixture passes over the carbon. In general, it may be said that, as the temperature of the carbon bed is increased, the contact time may be decreased. When a gaseous mixture such as that produced by either the "Wulff" or "Sachsse" process contains less than about 5 percent free oxygen, then such gaseous mixtures are preferably passed over the carbonaceous material, heated to a temperature between about 175° C. and 275° C., at space velocities between about 300 and 800 hr.$^{-1}$ (STP). Under these conditions, substantially complete reaction between the free oxygen and the heated carbonaceous material is effected to produce carbon oxides without appreciably affecting the saturated and unsaturated hydrocarbons and free hydrogen also present.

The preferred conditions for reacting hydrogen cyanide with an acetylene stream freed of oxygen to produce acrylonitrile are described in detail in the aforementioned copending application. Briefly the catalyst for this reaction comprises a deoxygenated, porous charcoal support impregnated with from about 3 percent to 15 percent by weight of either an alkali metal hydroxide, cyanide or carbonate. It has been found preferable to employ a deoxygenated charcoal impregnated with about 10 percent by weight of an alkali metal hydroxide, which is preferably either sodium or potassium hydroxide. The deoxygenated charcoal is preferably prepared by heating unactivated charcoal at a temperature above 500° C. in the presence of a reducing agent such as hydrogen until the charcoal has been substantially freed of combined and adsorbed oxygen and volatile organic materials. After the deoxygenated charcoal has been impregnated, it is preferably treated with hydrogen cyanide at atmospheric pressure at temperatures which are on the order of above about 500° C., since this treatment considerably shortens the time to react maximum acrylonitrile yields.

The temperature range in the reactor for producing acrylonitrile may vary from about 450° C. to about 700° C. However, it is preferably maintained between about 525° C. and 600° C. when the space velocity of the gases passing through the reactor is maintained between about 300 to 800 hr.$^{-1}$ (STP). The mole ratio of oxygen free acetylene to hydrogen cyanide may be varied quite widely between about 0.8:1 to about 1.6:1, preferred molar ratios being on the order of between about 0.9:1 to 1.2:1.

Since certain changes may be made in the above process without departing from the scope of the invention herein involved, it is intended that all matter contained in the above description shall be interpreted as illustrative and not in a limiting sense.

What is claimed is:

1. The process of producing acrylonitrile from the hydrogen cyanide and an acetylene stream which comprises passing an acetylene stream containing less than about 5 percent oxygen over charcoal heated to a temperature between about 175° C. and the temperature at which acetylene begins to oxidize to effect substantially complete removal of oxygen from said acetylene stream, passing the resultant oxygen-free acetylene stream and hydrogen cyanide over a support carrying a catalyst selected from the group consisting of the alkali metal hydroxides, cyanides and carbonates maintained at a temperature between about 450° C. and 700° C. and recovering the acrylonitrile produced.

2. The process of removing oxygen from oxygen-contaminated gaseous mixtures containing oxidizable hydrocarbons which comprises contacting said gaseous mixture with carbon heated to a temperature between about 175° C. and the temperature at which the oxidizable hydrocarbons begin to oxidize to effect substantially complete reaction between the oxygen and said heated carbon to form carbon oxides.

3. The process of claim 2 wherein said carbon comprises charcoal.

4. The process of removing oxygen from gaseous mixtures containing oxidizable hydrocarbons contaminated with less than about 5 percent oxygen which comprises passing said oxygen-contaminated gaseous mixtures over charcoal heated to a temperature between about 175° C. and the temperature at which the oxidizable hydrocarbons begin to oxidize to effect substantially complete reaction between the oxygen and said heated charcoal to form carbon oxides.

5. The process of removing oxygen from oxygen-contaminated dilute acetylene streams which comprises passing said dilute acetylene stream over charcoal heated to a temperature between about 175° C. and the temperature at which acetylene begins to oxidize to effect substantially complete reaction between the oxygen and said heated charcoal to form carbon oxides.

References Cited in the file of this patent

UNITED STATES PATENTS

| | | |
|---|---|---|
| 1,894,763 | Eisenhut et al. | Jan. 17, 1933 |
| 2,019,632 | Ray | Nov. 5, 1935 |
| 2,419,186 | Harris et al. | Apr. 15, 1947 |
| 2,502,678 | Spaulding et al. | Apr. 4, 1950 |

FOREIGN PATENTS

| | | |
|---|---|---|
| 302,306 | Great Britain | Dec. 19, 1929 |
| 584,662 | Great Britain | Jan. 20, 1947 |